US012621170B2

(12) United States Patent
Ekiert

(10) Patent No.: US 12,621,170 B2
(45) Date of Patent: May 5, 2026

(54) SECURE PEER-TO-PEER COMMUNICATION PROTOCOL

(71) Applicant: Aptiv Technologies AG, Schaffhausen (CH)

(72) Inventor: Andrzej Ekiert, Smolnica (PL)

(73) Assignee: Aptiv Technologies AG, Schaffhausen (CH)

( * ) Notice: Subject to any disclaimer, the term of this patent is extended or adjusted under 35 U.S.C. 154(b) by 146 days.

(21) Appl. No.: 18/428,557

(22) Filed: Jan. 31, 2024

(65) Prior Publication Data

US 2024/0259220 A1     Aug. 1, 2024

(30) Foreign Application Priority Data

Jan. 31, 2023     (EP) ..................................... 23154110

(51) Int. Cl.
H04L 29/06         (2006.01)
H04L 9/08         (2006.01)
(Continued)

(52) U.S. Cl.
CPC .......... H04L 9/3271 (2013.01); H04L 9/0869 (2013.01); H04L 9/3242 (2013.01); H04L 67/104 (2013.01)

(58) Field of Classification Search
CPC ... H04L 9/3271; H04L 9/0869; H04L 9/3242; H04L 67/104; H04L 9/3273; H04L 63/0435
See application file for complete search history.

(56) References Cited

U.S. PATENT DOCUMENTS

| | | | |
|---|---|---|---|
| 11,076,296 B1 * | 7/2021 | Kant | ...................... H04W 12/72 |
| 2009/0019284 A1 * | 1/2009 | Cho | ...................... H04L 9/3273 |
| | | | 713/170 |

(Continued)

FOREIGN PATENT DOCUMENTS

| | | | |
|---|---|---|---|
| EP | 1865656 A1 | 12/2007 | |
| WO | WO-0247356 A2 * | 6/2002 | ......... H04L 63/0457 |

OTHER PUBLICATIONS

Extended European Search Report for EP23154110.3 , 8 pages Jul. 11, 2023.

*Primary Examiner* — Shawnchoy Rahman
(74) *Attorney, Agent, or Firm* — Miller Johnson

(57)         ABSTRACT
A method for securely transmitting data between first and second processing units, each storing a shared secure key and respective first and second identifiers, includes transmitting an authentication challenge from the first processing unit to the second processing unit. The authentication challenge includes a first random number. The method includes generating a session key and an authentication key at each of the corresponding first and second processing units, based on the transmitted authentication challenge and the stored shared secure key. The method includes transmitting an authentication response including an authentication code generated from the authentication challenge based on the authentication key. The method includes verifying each processing unit by comparing a received authentication code with a locally generated authentication code. The method includes, in response to being verified, transmitting data between the first and second processing units using the corresponding session keys.

12 Claims, 2 Drawing Sheets

(51)  Int. Cl.
    *H04L 9/32*        (2006.01)
    *H04L 67/104*      (2022.01)

(56)                      References Cited

U.S. PATENT DOCUMENTS

2013/0014231 A1*  1/2013  Chu .................. H04W 36/0005
                                                      726/4
2013/0113275 A1   5/2013  Dwelley
2015/0113275 A1   4/2015  Kim
2018/0137486 A1*  5/2018  Nikkel ................ H04L 63/0435
2018/0206117 A1*  7/2018  Stahl .................... H04W 12/35
2020/0059784 A1*  2/2020  Batra ................... H04L 9/3271
2023/0032099 A1*  2/2023  Zheng ....................... H04L 9/14

* cited by examiner

SECURE PEER-TO-PEER COMMUNICATION PROTOCOL

CROSS-REFERENCE TO RELATED APPLICATIONS

This application claims priority to EP 23 154 110 filed Jan. 31, 2023, the entire disclosure of which is incorporated by reference.

FIELD

The present disclosure relates to communication between components and more particularly to encrypted point-to-point communications within vehicle electrical/electronic architectures.

BACKGROUND

There currently do not exist any standard solutions for authenticated encrypted reliable point-to-point communication between processors on a single PCB or, more generally, within a single device. Such entities are often communicated via media such as Serial Peripheral Interface (SPI), universal asynchronous receiver-transmitter (UART) or similar and either receive no protection at all or are protected with ad-hoc custom solutions, such as encrypting messages using a block cipher in an unauthenticated mode with an appended message authentication code (MAC).

However, unprotected communication leaves systems vulnerable to allowing attackers with physical access to the device to intercept, modify and retransmit traffic, resulting in extraction of secrets, reverse engineering of device functions and serving as a steppingstone to mount more complex attacks. This is particularly a concern in automotive applications because modern vehicles' electronic control systems play a crucial role in safety, as well as often communicating data to central servers.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Currently, ad-hoc solutions built upon block ciphers in unauthenticated modes are used in some circumstances. However, MAC codes carry the risk of misapplication of cryptographic primitives, resulting in protocol weaknesses that can be efficiently attacked (e.g. random or pseudo-random number reuse or using the same key for encryption and for authentication). For example, some proposed techniques reuse session keys for both encryption and MAC, which leaves communications vulnerable to attack. At the same time, there is no connection reliability guarantees. As such, any lost messages are not automatically retransmitted and are simply lost.

Accordingly, there remains a need to address the above shortcomings in communications.

According to a first aspect, there is provided a method for securely transmitting data between at least a first and second processing unit, each having stored a Shared Secure Key and a respective identifier, ID, and the ID of the other processing unit, the method comprising: transmitting an authentication challenge from the first processing unit to the second processing unit, comprising at least a first random number; generating a session key and an authentication key at each of the corresponding first and second processing units, based on the transmitted authentication challenge and the stored Shared Secure Key; transmitting an authentication response comprising a authentication code generated from the authentication challenge based on the authentication key; and verifying each processing unit by comparing the received authentication code with a locally generated authentication code; if verified, transmitting data between the first and second processing units using the corresponding session keys.

In this way, a method for secure inter-processor communication may be provided, such as communication between processing units within a single printed circuit board or electronic control unit using simple serial links such as UART or SPI. Advantageously, by provisioning each processing unit with the Shared Secure Key, fast establishment of session keys may be achieved, even when using low performance microcontrollers. This thereby allows for a secure communication link to be established quickly (e.g. within 10 s of milliseconds) after power up. Moreover, in the arrangement, both processing units are equivalent peers, and hence the protocol may be implemented without the concept of a client and server.

In embodiments, the method further comprises transmitting a second authentication challenge from the second processing unit to the first processing unit, comprising at least a second random number.

In embodiments, the method further comprises generating a second session key and a second authentication key at each of the corresponding first and second processing units based on the transmitted authentication challenge and the stored Shared Secure Key; and transmitting a second authentication response comprising a second authentication code generated from the second authentication challenge based on the second authentication key, wherein the step of verifying each processing unit comprises verifying the first processing unit by comparing the received authentication code with a locally generated authentication code.

In embodiments, the Shared Secure Key is a Shared Symmetric Key, SSK.

In embodiments, the step of generating the session key comprises using a key derivation function, KDF, keyed with the Shared Secure Key.

In embodiments, the authentication key is an ephemeral authentication key.

In embodiments, the authentication code is a Cipher-based message authentication code (CMAC).

In embodiments, the step of transmitting the authentication challenge comprises monitoring out-of-time responses where the authentication response is not received within a timeout period, wherein, in response to identifying an out-of-time response, a new authentication challenge is generated comprising a new random number.

In embodiments, at least one of the steps of verifying the processing units comprises monitoring out-of-sequence responses received before the step of transmitting the respective authentication challenge.

In embodiments, in response to identifying an out-of-sequence response, verification is prevented.

According to a second aspect, there is provided a processing unit for secure communication with a second processing unit, comprising: a memory storing a Shared Secure Key, and an identifier, ID, and a second ID associated with a second processing unit; a random number generator for generating a first random number; a processor configured to: transmit an authentication challenge to the second processing unit, where the authentication challenge comprises the first random number; generate a session key and an authentication key based on a received authentication challenge received from a second processing unit and the Shared Secure Key; receive an authentication response from the second processing unit, comprising a authentication code generated from the authentication challenge using the authentication key; verify the second processing unit by comparing the received authentication code with a locally generated authentication code; transmit data to the second processing unit using the session key.

In embodiments, the processing unit further comprises a timeout timer for timing the receipt of the authentication response, wherein the processor is configured to generate a new authentication challenge comprising a new random number if the authentication response is not received within a timeout period.

In embodiments, the processor is configured to monitor for out-of-sequence responses received before the step of transmitting the respective authentication challenge.

In embodiments, in response to identifying an out-of-sequence response, verification is prevented.

According to a third aspect, there is provided non-transient computer readable medium comprising instructions which, when executed by a processor, implement a method of securely transmitting data between a first and second processing unit, each having stored a Shared Secure Key and a respective identifier, ID, and the ID of the other processing unit, the method comprising: transmitting an authentication challenge from the first processing unit to the second processing unit, comprising at least a first random number; generating a session key and an authentication key at each of the corresponding first and second processing units, based on the transmitted authentication challenge and the stored Shared Secure Key; transmitting an authentication response comprising a authentication code generated from the authentication challenge based on the authentication key; and verifying each processing unit by comparing the received authentication code with a locally generated authentication code; if verified, transmitting data between the first and second processing units using the corresponding session keys.

According to a fourth aspect, there is provided a non-transient computer readable medium containing the above computer software product.

According to a further aspect, there is provided a method for securely transmitting data between a first and second processing unit, each having stored a Shared Symmetric Key, SSK, and a respective identifier, ID, known to the other processing unit, the method comprising: transmitting a first authentication challenge from the first processing unit to the second processing unit, where the first authentication challenge comprises a first random number; transmitting a second authentication challenge from the second processing unit to the first processing unit, where the second authentication challenge comprises a second random number; generating a first session key, a second session key, a first authentication key and a second authentication key at each of the first and second processing units, using the first and second authentication challenge frames and the SSK; transmitting a first authentication response from the second processing unit to the first processing unit, where the first authentication response carries a first authentication code generated from the first authentication challenge using the first authentication key; at the first processing unit, verifying the second processing unit using the first authentication response if the received first authentication code contained therein matches a corresponding authentication code generated from the first authentication challenge using the first authentication key; transmitting a second authentication response from the first processing unit to the second processing unit, where the second authentication response carries a second authentication code generated from the second authentication challenge using the second authentication key; at the second processing unit, verifying the first processing unit using the second authentication response if the received second authentication code contained therein matches a corresponding authentication code generated from the second authentication challenge using the second authentication key; and if verified, transmitting data frames between the first and second processing units using the respective first and second session keys.

In embodiments, the step of transmitting data frames comprises using an Authenticated Encryption with Associated Data, AEAD, scheme. In embodiments, the AEAD scheme comprises using an Advanced Encryption Standard, AES, block cypher. In embodiments, Galois Counter Mode (GCM) is used. In embodiments, each of the first and second processing units are provisioned with the Shared Symmetric Key, SSK, during manufacture.

In embodiments, at least one of the steps of transmitting the first and second authentication challenge frames further comprises the respective processing unit starting a timeout timer for receipt of the respective first and second authentication response frame, wherein if the respective first and second authentication response is not received within a timeout period, a new authentication challenge is generated comprising a new random number.

In embodiments, at least one of the steps of verifying the first and second processing units comprises failing the verification if the respective first or second authentication response is received before the step of transmitting the respective first and second authentication challenge frame.

In embodiments, at least one of the first and second random numbers is generated using a True Random Number Generator, TRNG, or a Pseudo-Random Number Generator, PRNG.

According to a further aspect of the present invention, there is provided a processing unit for secure communication with a second processing unit, comprising: a memory storing a Shared Symmetric Key, SSK, and a first identifier, ID, and a second ID associated with the second processing unit; a random number generator for generating a first random number; a processor configured to: transmit a first authentication challenge to the second processing unit, where the first authentication challenge comprises the first random number; receive a second authentication challenge from the second processing unit, where the second authentication challenge comprises a second random number; generate a first session key, a second session key, a first authentication key, and a second authentication key at the first processing unit using the first and second authentication challenge frames and the SSK; receive a first authentication response from the second processing unit, where the first authentication response carries a first authentication code generated from the first authentication challenge using the first authentication key; verify the second processing unit using the first authentication response if the received first authentication code contained therein matches a corresponding authentication code generated from the first authentication challenge using the first authentication key; transmit a second authentication response to the second processing unit, where the second authentication response carries a second authentication code generated from the second authentication challenge using the second authentication key; and transmit data frames to the second processing unit using the first session key.

In embodiments, the Shared Symmetric Key, SSK, is stored in the memory during manufacture. In embodiments, the processor is configured to generate the first session key using a key derivation function, KDF, keyed with the SSK.

According to a further aspect of the present invention, there is provided a computer software product comprising instructions which, when executed by a processor, implement a method of securely transmitting data between a first and second processing unit, each having stored a Shared Symmetric Key, SSK, and a respective identifier, ID, known to the other processing unit, wherein the method comprises: transmitting a first authentication challenge from the first processing unit to the second processing unit, where the first authentication challenge comprises a first random number; receiving a second authentication challenge from the second processing unit at the first processing unit, where the second authentication challenge comprises a second random number; generating a first session key, a second session key, a first authentication key, and a second authentication key at the first processing unit using the first and second authentication challenge frames and the SSK; receiving a first authentication response from the second processing unit at the first processing unit, where the first authentication response carries a first authentication code generated from the first authentication challenge using the first authentication key; verifying the second processing unit using the first authentication response if the received first authentication code contained therein matches a corresponding authentication code generated from the first authentication challenge using the first authentication key; transmitting a second authentication response to the second processing unit, where the second authentication response carries a second authentication code generated from the second authentication challenge using the second authentication key; and, if verified, transmitting data frames from the first processing unit using the first session key.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Illustrative embodiments will now be described with reference to the accompanying drawings in which.

In the drawings, reference numbers may be reused to identify similar and/or identical elements.

DETAILED DESCRIPTION

Figure 1:
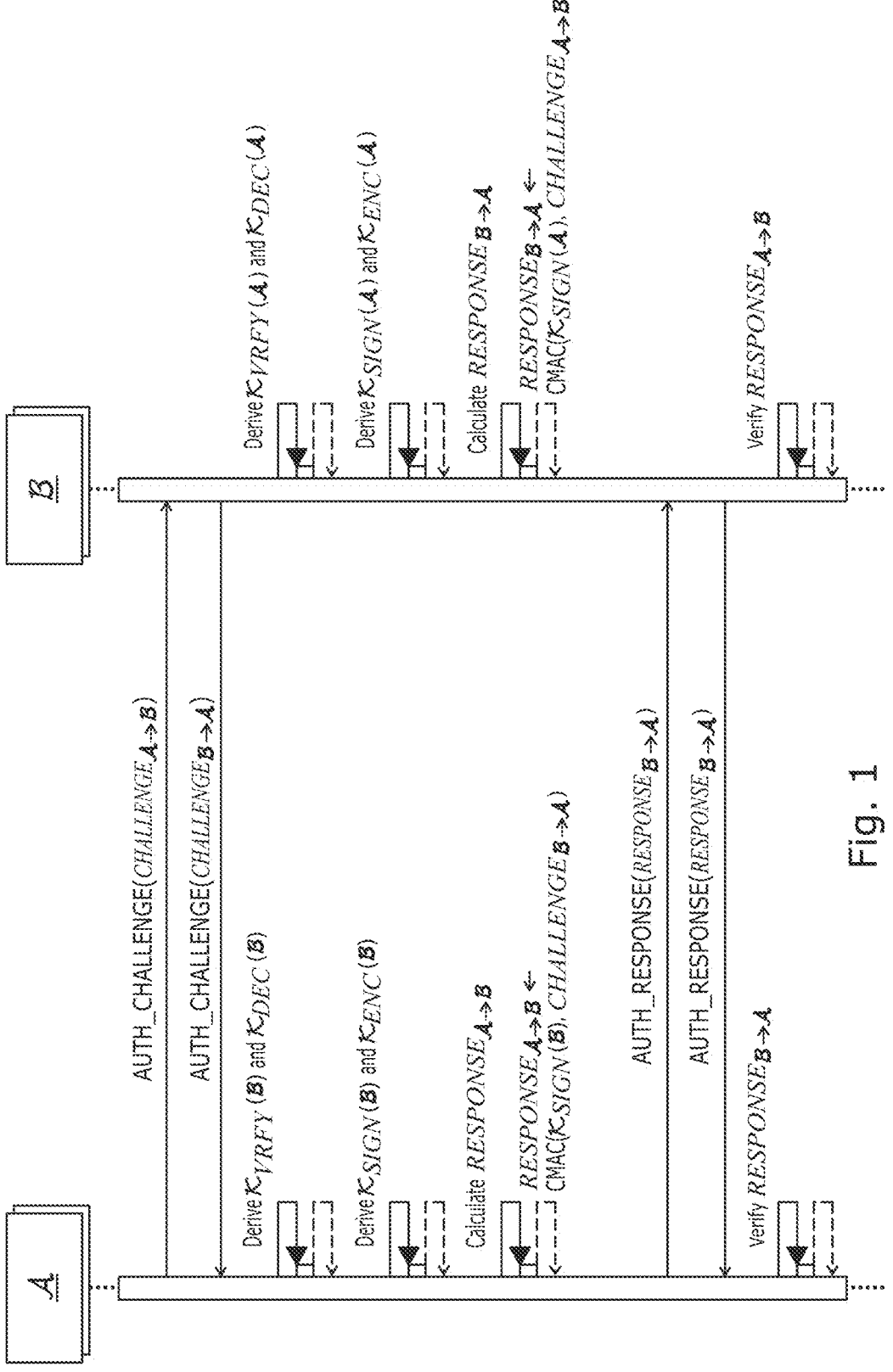
FIG. 1 shows a schematic illustration of a mutual authentication sequence according to a first embodiment.
Figure 2:
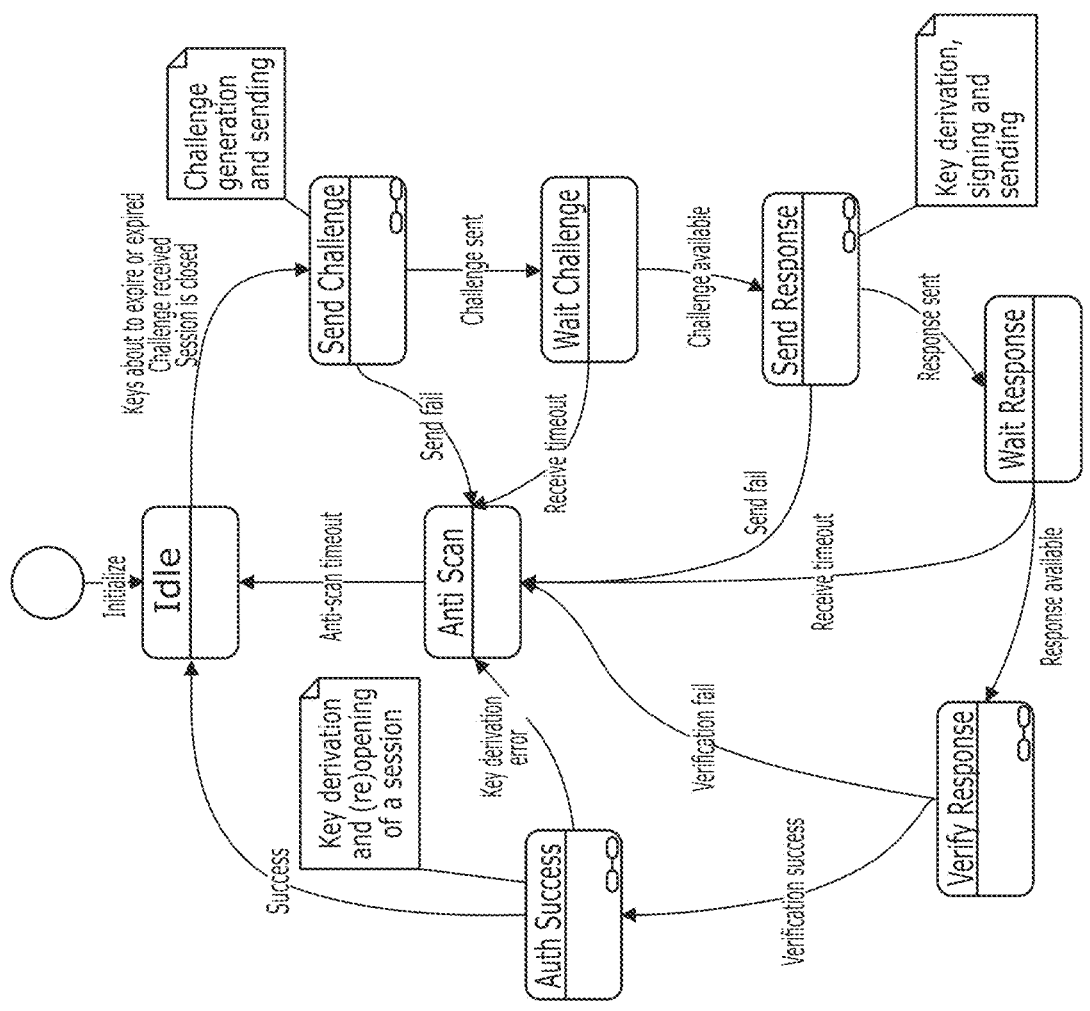
FIG. 2 shows the authentication state machine for the sequence shown in FIG. 2.

The present invention concerns a secure peer to peer communication protocol for inter-processor communications. The protocol includes two phases of operation. In a first, authentication, phase the peers establish session keys and authenticate each other. This authentication phase is shown in FIGS. 1 and 2. In a second phase, the peer-to-peer communications are established for exchanging data. In this data exchange phase, the protocol uses an Authenticated Encryption with Associated Data (AEAD) scheme to provide authenticity, integrity and confidentiality guarantees.

In this connection, communications are transmitted using a plurality of frames, with each frame designating an outer protocol unit that includes the fields related to encryption and authentication. Each frame contains a packet representing an inner protocol unit that is transmitted in an encrypted form within AEAD frames.

The procedure is implemented between two peer devices, identified as A and B in FIG. 1. Both devices are provided during manufacturing with a Shared Symmetric Key (SSK).

In the authentication phase, A sends an AUTH_CHALLENGE frame to B. This authentication frame contains a 128-bit random number, $CHALLENGE_{A \to B}$. B also sends an AUTH_CHALLENGE frame to A, containing a 128-bit random number, $CHALLENGE_{B \to A}$. A and B both have different 4-byte node identifiers (IDs), IDA and IDB, which are also provided to each other during manufacture.

The node IDs may be configured statically during compiling. If AES-GCM is used as the AEAD cipher, then the fixed field value that is used in the Initialization Vector (IV) construction may also be used as a Node ID. The Node ID values are different for each Processing Unit in the link. The Node IDs are used to prevent reflection attacks during the authentication phase by ensuring that the keys KVRFY(B) and KSIGN(B) are different, even if an attacker were to reflect A's challenge frame back to A. They also ensure that data encryption keys in both directions are different in the unlikely case that the challenges generated by both A and B are identical.

A uses $(IDA \| IDB \| CHALLENGE_{A \to B} \| CHALLENGE_{B \to A})$, where $\|$ denotes concatenation, and a KDF keyed with SSK to derive a session key for reception from B and an ephemeral authentication key for challenge response verification from B:

$K_{VRFY}(B)$: key for verifying challenge response from B.
$K_{DEC}(B)$: key used to decrypt frames from B.

A uses $(IDA \| IDB \| CHALLENGE_{B \to A} \| CHALLENGE_{A \to B})$ and a KDF keyed with SSK to derive a session key for transmission to B and an ephemeral authentication key for challenge response calculation to B:

$K_{SIGN}(B)$: key for generating challenge response to B.
$K_{ENC}(B)$: key used to encrypt frames to B.

B uses $(IDA \| IDB \| CHALLENGE_{B \to A} \| CHALLENGE_{A \to B})$ and a KDF keyed with SSK to derive a session key for reception from A and an ephemeral authentication key for challenge response verification from A:

$K_{VRFY}(A)$: key for verifying challenge response from A.
$K_{DEC}(A)$: key used to decrypt frames from A.

The keys $K_{VRFY}(A)$ and $K_{DEC}(A)$ derived by B are the same as the keys $K_{SIGN}(B)$ and $K_{ENC}(B)$, respectively, derived by A for transmission to B.

B uses $(IDA \| IDB \| CHALLENGE_{A \to B} \| CHALLENGE_{B \to A})$ and a KDF keyed with SSK to derive a session key for transmission to A and an ephemeral authentication key for challenge response calculation to A:

$K_{VRFY}(A)$: key for generating challenge response to A.
$K_{DEC}(A)$: key used to encrypt packets to A.

These keys $K_{VRFY}(A)$ and $K_{DEC}(A)$ derived by B are the same as the keys $K_{SIGN}(B)$ and $K_{ENC}(B)$, respectively, derived by A for reception from B.

B sends an AUTH_RESPONSE frame to A. It contains unencrypted $RESPONSE_{B \to A} \leftarrow CMAC(K_{SIGN}(A), CHALLENGE_{A \to B})$.

A verifies B using the $RESPONSE_{B \to A}$ contained in the AUTH_RESPONSE frame sent by B. Verification is performed by comparing if the received CMAC contained therein matches a corresponding CMAC generated from the first authentication challenge frame using the corresponding K(B) (i.e. $\text{RESPONSE}_{B \to A} = \text{CMAC}(K_{VRFY}(B), \text{CHALLENGE}_{A \to B})$).

If the verification succeeds, then host A trusts the identity of host B (A trusts that B knows the SSK). A sends an AUTH_RESPONSE frame to B. It contains unencrypted $\text{RESPONSE}_{A \to B} \leftarrow \text{CMAC}(K_{SIGN}(B), \text{CHALLENGE}_{B \to A})$.

B similarly verifies A by comparing if the received CMAC contained therein matches a corresponding CMAC generated from the first authentication challenge frame using the corresponding $K_{VRFY}(A)$ (i.e. $\text{RESPONSE}_{A \to B}(\text{CMAC}(K_{VRFY}(A), \text{CHALLENGE}_{B \to A})$. If the verification succeeds, then host $B_{VRFYB \to A}$ trusts the identity of host A (B trusts that A knows the SSK).

During the authentication phase, the processing units are configured to implement a timeout procedure. For example, after generating an AUTH_CHALLENGE in response to a received AUTH_CHALLENGE frame, a processing unit shall start an anti-scanning timeout of an implementation-defined, randomized length, but not shorter than, for example, 1 second. The purpose of this timeout is to protect the entropy of the RNG and to prevent potential brute-force attacks against the key generation algorithm. The random component of this timeout will ensure that in case challenges pass each other "in the wire", while the peers have different understanding of which challenges are valid, the challenges will eventually desynchronize and the authentication will get unblocked. A particular host processing unit will inhibit sending new AUTH_CHALLENGE frames until the anti-scanning timeout has elapsed. If a host does not receive an AUTH_CHALLENGE frame within an implementation-defined timeout after sending its own challenge, it shall generate and send a new challenge. If a host does not receive an AUTH_RESPONSE frame within an implementation-defined timeout, it shall discard all authentication data, such as challenges both sent and received, and start anew by sending a freshly-generated AUTH_CHALLENGE. The challenge and response timeout durations shall be set longer than the anti-scanning timeout to avoid blocking session establishment due to inability of peers to respond to each other before challenge and response timeouts expire. If a host receives an AUTH_RESPONSE frame without receiving a prior AUTH_CHALLENGE frame, it can be identified as an indication that the AUTH_CHALLENGE frame was sent by the peer and lost (among other reasons, it is possible that the receiving party was not ready to receive yet). When this happens, the host shall reset the authentication state machine, wait for the anti-scanning timeout to elapse and start anew by sending a freshly-generated AUTH_CHAL-LENGE. It is possible that the response timeout on the peer will expire before the anti-scanning timeout on the host—in that case the peer will be the first to send a new AUTH_CHALLENGE. A host receiving a new AUTH_CHALLENGE frame while expecting an AUTH_RESPONSE frame shall discard all authentication data, accept the new challenge and respond with its own fresh AUTH_CHALLENGE followed by an AUTH_RESPONSE, provided that the anti-scanning timeout has elapsed.

Once the authentication phase has completed and both peer processing units are verified, data frames may then be transmitted between them using the respective first and second session keys. The data frames are constructed in such a way, that their LEN and FRAME ID fields are authenticated by the AEAD protocol but not encrypted, thus achieving confidentiality, integrity and authenticity for DATA frames, while providing plaintext visibility compatible with frame types not requiring AEAD encryption such as AUTH_CHALLENGE and AUTH_RESPONSE.

On initializing communications, a first peer device out of A and B will initiate a new key exchange when the number of AEAD scheme invocations with a given key approaches a defined maximum value. The first peer will then stop using keys and close the session when the number of AEAD scheme invocations reaches the defined maximum value. For AES-GCM the maximum number of invocations is not larger than $2^{30}$, although the implementation may be configured to perform re-keying earlier. This satisfies the cryptographic requirements for the AES-GCM scheme in the selected configuration of Initialization Vector (IV) length and construction, key length and tag length.

The above said, re-keying shall not reset the sequence and acknowledge numbers, as it would introduce ambiguity in case there are packets pending for retransmission or unacknowledged. Instead, the transmitter increments the SEQ number with each new packet transmitted, except for ACK_ONLY packets. The sequence and acknowledge numbers shall not roll over into the MSb. The receiver shall drop a packet that carries a SEQ number different from the expected number and respond with a packet with the NACK bit set. The transmitter shall buffer the packets sent and wait for their acknowledgement. A packet shall be considered acknowledged, if a packet carrying ACK number equal to or greater than its SEQ number is received.

When retransmitting unacknowledged packets, the transmitter shall update the ACK number they carry to reflect the most recent SEQ number received. A host that has no data to send shall acknowledge packets using an ACK_ONLY packet. The SEQ number in ACK_ONLY packets shall remain the same as used in the preceding packet. No ACK_ONLY packets shall be sent in response to ACK_ONLY packets. The DATA field in ACK_ONLY packets shall be empty. ACK_ONLY packets shall have the PKT_ID field set to 0x0000.

The processing unit transmitting packets may cease to retransmit packets in case the acknowledge response does not arrive within a predetermined time. This retransmission timeout period may be set depending on the application. The implementation may provide a packet-individual timeout, indicating when it does not make sense any more to try to retransmit.

Upon reception of a packet with the NACK bit set, a host shall retransmit all packets sent since the last acknowledged packet. If the packets are no longer available for retransmission, the host shall resynchronize by utilizing the FORCE bit.

The FORCE bit shall only cause forward jumps in the sequence. The receiver must not move backwards in the sequence, as it would risk accepting the same packet twice. This reaction to the FORCE bit requires a different approach to resynchronization when one of the peers is reset. A peer that has been reset shall keep in the acknowledge queue at most one transmitted packet until it has received the first packet from the other side. Upon reception of the first packet, the peer shall adjust its sequence and acknowledge numbers to match the numbers from the received packet.

Accordingly, with the above arrangement, confidentiality, integrity and authenticity needs may be addressed by applying an Authenticated Encryption with Associated Data (AEAD) cryptographic scheme to protocol data units (PDUs). The issue of connection reliability is addressed using retransmissions with sequence numbers and acknowledgments. Advantageously, the protocol can be applied in any situation where two peers with pre-shared keys need to establish bi-directional reliable communication with confidentiality, integrity and authenticity guarantees. The protocol is especially suited to cases where complex high-level protocols such as (Transport Layer Security) TLS or Internet Protocol Security (IPsec) are not practical due to e.g. limited performance or limited resources of the communicating peers or low throughput of the communication channel.

The protocol establishes session keys that are derived from a shared secret that is provided out-of-band to both communicating peers. The session key establishment process employs random nonces generated using True Random Number Generators (RNGs) and provides mutual authentication of the peers. The session key establishment process protects against nonce/key pair reuse in the case of device reset. The protocol can also accommodate various AEAD schemes, such as ChaCha20-Poly1305 and Salsa20-Poly1305, as well as GCM, CCM and EAX with block ciphers including AES, Camellia and Twofish. This use of an established AEAD scheme eliminates the issues that might otherwise be associated with the potentially incorrect application of individual cryptographic primitives.

It will be understood that the embodiments illustrated above show applications only for the purposes of illustration. In practice, embodiments may be applied to many different configurations, the detailed embodiments being straightforward for those skilled in the art to implement.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for securely transmitting data between a first processing unit and a second processing unit, each storing a shared secure key and respective first and second identifiers, the method comprising:

transmitting a first authentication challenge from the first processing unit to the second processing unit, wherein the first authentication challenge includes a first random number;

transmitting a second authentication challenge from the second processing unit to the first processing unit, wherein the second authentication challenge includes a second random number;

generating a first session key and a first authentication key at the first processing unit using the first authentication challenge, the second authentication challenge, and the stored shared secure key;

generating a second session key and a second authentication key at the second processing unit using the first authentication challenge, the second authentication challenge, and the stored shared secure key;

transmitting a first authentication response from the first processing unit to the second processing unit, wherein the first authentication response includes a first authentication code generated from the second authentication challenge using the first authentication key;

verifying the first processing unit at the second processing unit in response to the first authentication code matching a local authentication code generated from the second authentication challenge using the second authentication key; and in response to being verified, transmitting data from the second processing unit to the first processing unit using the second session key.

2. The method of claim 1 wherein the shared secure key is a shared symmetric key (SSK).

3. The method of claim 1 wherein generating the first session key and the second session key includes using a key derivation function (KDF) keyed with the shared secure key.

4. The method of claim 1 wherein the first authentication key and the second authentication key are ephemeral authentication keys.

5. The method of claim 1 wherein the first authentication code and the local authentication code are Cipher-based message authentication codes (CMAC).

6. The method of claim 1 wherein:

transmitting the first authentication challenge includes monitoring out-of-time responses where the first authentication response is not received within a timeout period, and the method further comprises, in response to identifying an out-of-time response, generating a new first authentication challenge including a new random number.

7. The method of claim 1 wherein verifying at least one of the processing units includes monitoring out-of-sequence responses received before transmitting the respective authentication challenge.

8. The method of claim 7 wherein, in response to identifying an out-of-sequence response, verification is prevented.

9. A first processing unit for secure communication with a second processing unit, the first processing unit comprising:

a memory storing a shared secure key, a first identifier (ID), and a second ID, wherein the second ID is associated with the second processing unit;

a random number generator configured to generate a first random number; and a processor configured to:

transmit a first authentication challenge to the second processing unit, wherein the first authentication challenge includes the first random number;

receive a second authentication challenge from the second processing unit, wherein the second authentication challenge includes a second random number;

generate a first session key and a first authentication key using the first authentication challenge, the second authentication challenge, and the shared secure key;

receive a second authentication response from the second processing unit, wherein the second authentication response includes a second authentication code generated from the first authentication challenge using a second authentication key generated at the second processing unit;

verify the second processing unit in response to the second authentication code matching a local authentication code generated from the first authentication challenge using the first authentication key; and in response to the second processing unit being verified, transmit data to the second processing unit using the first session key.

10. The first processing unit of claim 9 further comprising:

a timeout timer for timing receipt of the second authentication response, wherein the processor is configured to generate a new authentication challenge, including a new random number, in response to the second authentication response not being received within a timeout period.

11. The first processing unit of claim 9 wherein the processor is configured to monitor for out-of-sequence responses received before transmitting the respective authentication challenge.

12. A non-transitory computer-readable medium comprising instructions that include:

transmitting a first authentication challenge from a first processing unit to a second processing unit, wherein the first authentication challenge includes a first random number;

transmitting a second authentication challenge from the second processing unit to the first processing unit, wherein the second authentication challenge includes a second random number;

generating a first session key and a first authentication key at the first processing unit using the first authentication challenge, and the second authentication challenge, and a stored shared secure key;

generating a second session key and a second authentication key at the second processing unit using the first authentication challenge, the second authentication challenge, and the stored shared secure key;

transmitting a first authentication response from the first processing unit to the second processing unit, wherein the first authentication response includes a first authentication code generated from the second authentication challenge using the first authentication key;

verifying the first processing unit at the second processing unit in response to the first authentication code matching a local authentication code generated from the second authentication challenge using the second authentication key; and in response to being verified, transmitting data from the second processing unit to the first processing unit using the second session key.

* * * * *